(12) United States Patent
Kim et al.

(10) Patent No.: US 9,015,077 B2
(45) Date of Patent: Apr. 21, 2015

(54) METHOD AND APPARATUS FOR EFFICIENTLY ENCRYPTING/DECRYPTING DIGITAL CONTENT ACCORDING TO BROADCAST ENCRYPTION SCHEME

(75) Inventors: Bong-seon Kim, Seongnam-si (KR); Myung-sun Kim, Uiwang-si (KR); Sung-hyu Han, Seoul (KR); Young-sun Yoon, Suwon-si (KR); Sun-nam Lee, Suwon-si (KR); Jae-heung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1497 days.

(21) Appl. No.: 11/411,797

(22) Filed: Apr. 27, 2006

(65) Prior Publication Data

US 2006/0253401 A1    Nov. 9, 2006

(30) Foreign Application Priority Data

May 9, 2005    (KR) .................. 10-2005-0038493

(51) Int. Cl.
| | |
|---|---|
| G06F 21/00 | (2013.01) |
| G06Q 20/12 | (2012.01) |
| G06F 21/10 | (2013.01) |
| H04L 9/08 | (2006.01) |

(52) U.S. Cl.
CPC ............ *G06Q 20/1235* (2013.01); *G06F 21/10* (2013.01); *G06F 2221/0771* (2013.01); *G06F 2221/2107* (2013.01); *H04L 9/0822* (2013.01); *H04L 9/0825* (2013.01); *H04L 9/0836* (2013.01); *H04L 9/0891* (2013.01); *H04L 2209/60* (2013.01); *H04L 2209/603* (2013.01); *Y10S 705/902* (2013.01); *Y10S 705/901* (2013.01)

(58) Field of Classification Search
USPC .............................................. 705/59
See application file for complete search history.

(56) References Cited

U.S. PATENT DOCUMENTS

| | | | |
|---|---|---|---|
| 6,530,020 B1 | 3/2003 | Aoki | |
| 2003/0081792 A1 | 5/2003 | Nakano et al. | |
| 2003/0142826 A1 | 7/2003 | Asano | |
| 2003/0221097 A1* | 11/2003 | Nakano et al. | ............... 713/150 |

(Continued)

FOREIGN PATENT DOCUMENTS

| | | |
|---|---|---|
| EP | 1235381 A1 | 8/2002 |
| JP | 1122227 A | 5/1989 |

(Continued)

OTHER PUBLICATIONS

Communication dated Feb. 14, 2012 from the Japanese Patent Office in counterpart Japanese application No. 2008-511045.

(Continued)

*Primary Examiner* — James A Reagan
(74) *Attorney, Agent, or Firm* — Sughrue Mion, PLLC

(57) ABSTRACT

A method of and apparatus for encrypting and/or decrypting content according to broadcast encryption scheme. The decryption method includes: determining whether or not a revoked device among devices that have licenses for predetermined content is present; and according to the determination result, selectively decrypting a content key encrypted by using a key to prevent the revoked device from decrypting the predetermined content. By doing so, an unnecessary encryption process and decryption process that occur when there is no revoked device are avoided.

11 Claims, 7 Drawing Sheets

(56) References Cited

U.S. PATENT DOCUMENTS

| | | |
|---|---|---|
| 2004/0114762 A1 | 6/2004 | Medvinsky |
| 2004/0128259 A1 | 7/2004 | Blakeley et al. |
| 2004/0230819 A1 | 11/2004 | Takahashi |
| 2005/0066167 A1* | 3/2005 | Asano et al. ............ 713/165 |
| 2006/0179478 A1 | 8/2006 | Han et al. |

FOREIGN PATENT DOCUMENTS

| | | |
|---|---|---|
| JP | 1115373 A | 1/1999 |
| JP | 2003204320 A | 7/2003 |
| JP | 2004341768 A | 12/2004 |
| KR | 20020073035 A | 9/2002 |
| KR | 10-0543630 B1 | 1/2006 |
| WO | 2006-083141 A1 | 8/2006 |
| WO | WO 2006083141 A1 * | 8/2006 |

OTHER PUBLICATIONS

Search Report dated Aug. 21, 2013, issued by the European Patent Office in counterpart European Application No. 06757621.5.

Communication issued on Aug. 6, 2007 by the Intellectual Property Office of Korea in the corresponding Korean Patent Application No. 10-2005-0038493.

* cited by examiner

CONTENT KEY + CONTENT ⇒ ENCRYPTED CONTENT

REVOCATION KEY + CONTENT KEY ⇒ ENCRYPTED CONTENT KEY

METHOD AND APPARATUS FOR EFFICIENTLY ENCRYPTING/DECRYPTING DIGITAL CONTENT ACCORDING TO BROADCAST ENCRYPTION SCHEME

CROSS-REFERENCE TO RELATED PATENT APPLICATIONS

This application claims the benefit of priority from Korean Patent Application No. 10-2005-0038493, filed on May 9, 2005, in the Korean Intellectual Property Office, the disclosure of which is incorporated herein in its entirety by reference.

BACKGROUND OF THE INVENTION

1. Field of the Invention

The present invention broadly relates to digital content protection and, more particularly, to an apparatus for and a method of efficiently encrypting and/or decrypting digital content according to a broadcast encryption scheme.

2. Description of the Related Art

Recently, the transmission of digital contents using a variety of communication media including the Internet, ground wave, cable, and satellites and sales and rental of digital contents using high capacity recording media have rapidly increased. Accordingly, digital rights management (DRM) that is a solution to protect copyright of digital contents has been emerging as an important issue. Among technologies related to the DRM, research on a broadcast encryption scheme, (by which widely distributed digital contents are protected by encrypting the digital contents broadcast by using recording media, such as a CD, a DVD and the Internet), has been actively conducted.

FIG. 1 illustrates the conventional broadcast encryption scheme.

Referring to FIG. 1, the conventional broadcast encryption scheme uses a 2-stepped encryption process, in which digital content is encrypted by using a content key and the content key used for the encryption is encrypted by using a revocation key. Generally, digital content encrypted by using a content key CK is expressed as E(CK, Content), and the content key encrypted by using a revocation key {Ki} is expressed as {E(Ki, CK)}. Here, the curly brackets { } indicate that the revocation key {Ki} is a key set formed with a plurality of Ki's.

Also, in order to decrypt the content encrypted according to the conventional broadcast encryption scheme, a 2-stepped decryption process should be performed in which the encrypted content key is decrypted by using a revocation key and the encrypted content is decrypted by using the obtained content key.

The revocation key described above is allocated to each of devices to which the broadcast encryption scheme is applied, and among these devices, a device that cannot be protected any more by the broadcast encryption scheme due to exposure of the revocation key or to other reasons is revoked. Thus, revoked device cannot decrypt a digital content complying with the broadcast encryption scheme by using a revocation key that the revoked device has.

FIG. 2 illustrates an example of a tree used in the conventional broadcast encryption scheme.

Referring to FIG. 2, one parent node has two child nodes in the tree shown in FIG. 2 and the tree is a binary 4-level tree formed with 4 levels. Also, one key is allocated to each of the nodes of the tree.

The top node among the nodes of the tree is referred to as a root node, and a node at the bottom is referred to as a leaf node. According to the conventional broadcast encryption scheme, each of the devices corresponds to one of the leaf nodes and keys {Ki} of nodes, positioned on a path from a respective leaf node of the respective device to the root node, are allocated to the device.

For example, in case of key set allocation of a device 1, keys of nodes positioned on the path from the leaf node corresponding to the device 1 to the root node are K1, K2, K4, and K8 and these keys are allocated to the device 1.

If all devices are not revoked, a content server performing broadcast encryption encrypts a content key by using only the key K1 of the root node, and a device performing decryption corresponding to the broadcast encryption decrypts the encrypted content key by using only the key K1 of the root node. Also, if only devices 1 and 2 are revoked among the devices, the content server performing broadcast encryption encrypts a content key by using revocation keys K3 and K5, and a device performing decryption corresponding to the broadcast encryption decrypts the encrypted key by using the revocation keys K3 and K5.

However, according to the conventional broadcast encryption scheme, the content server performing broadcast encryption should encrypt a content key by always using a revocation key, and the device performing decryption corresponding to the broadcast encryption should decrypt the encrypted content by always using the revocation key. In other words, a revocation key is used whether a revoked device is present or not. Accordingly, this increases the computational load on the content server and the device to which the conventional broadcast encryption scheme is applied.

SUMMARY OF THE INVENTION

The present invention provides an apparatus and method of protecting digital content by selectively encrypting and/or decrypting a content key according to whether there is a revoked device among devices to which a broadcast encryption scheme is applied.

The present invention also provides a computer readable recording medium having embodied thereon a computer program for executing the method described above.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

According to an aspect of the present invention, there is provided a decryption method including: determining whether or not there is a revoked device among devices having licenses for predetermined content; and according to the determination result, selectively decrypting a content key encrypted by using a key to prevent the revoked device from decrypting the predetermined content, wherein the content key is the key used to encrypt the predetermined content.

According to another aspect of the present invention, there is provided a decryption apparatus including: a determination unit determining whether or not there is a revoked device among devices having licenses for predetermined content; and a decryption unit selectively decrypting a content key encrypted by using a key to prevent the revoked device from decrypting the predetermined content, according to the determination result of the determination unit, wherein the content key is the key used to encrypted the predetermined content.

According to yet another aspect of the present invention, there is provided a computer readable recording medium having embodied thereon a computer program for executing the decryption method described above.

According to yet another aspect of the present invention, there is provided an encryption method including: determining whether or not there is a revoked device among devices having licenses for predetermined content; and according to the determination result, selectively encrypting a content key used to encrypt the predetermined content by using a key to prevent the revoked device from decrypting the predetermined content.

According to a further aspect of the present invention, there is provided an encryption apparatus including: a determination unit determining whether or not there is a revoked device among devices having licenses for predetermined content; and an encryption unit selectively encrypting a content key used to encrypt the predetermined content by using a key to prevent the revoked device from decrypting the predetermined content, according to the determination result of the determination unit.

According to an additional aspect of the present invention, there is provided a computer readable recording medium having embodied thereon a computer program for executing the encryption method described above.

According to an additional aspect of the present invention, there is provided a computer readable recording medium having a data structure recorded thereon, the data structure including: a first field recording encrypted content; and a second field recording license information on the content, wherein the second field includes a first subfield that records a value indicating whether or not there is a revoked device among devices having licenses for the content.

BRIEF DESCRIPTION OF THE DRAWINGS

The above and/or other features of the present invention will become more apparent by describing in detail exemplary, non-limiting embodiments thereof with reference to the accompanying drawings, in which.

Figure 1:
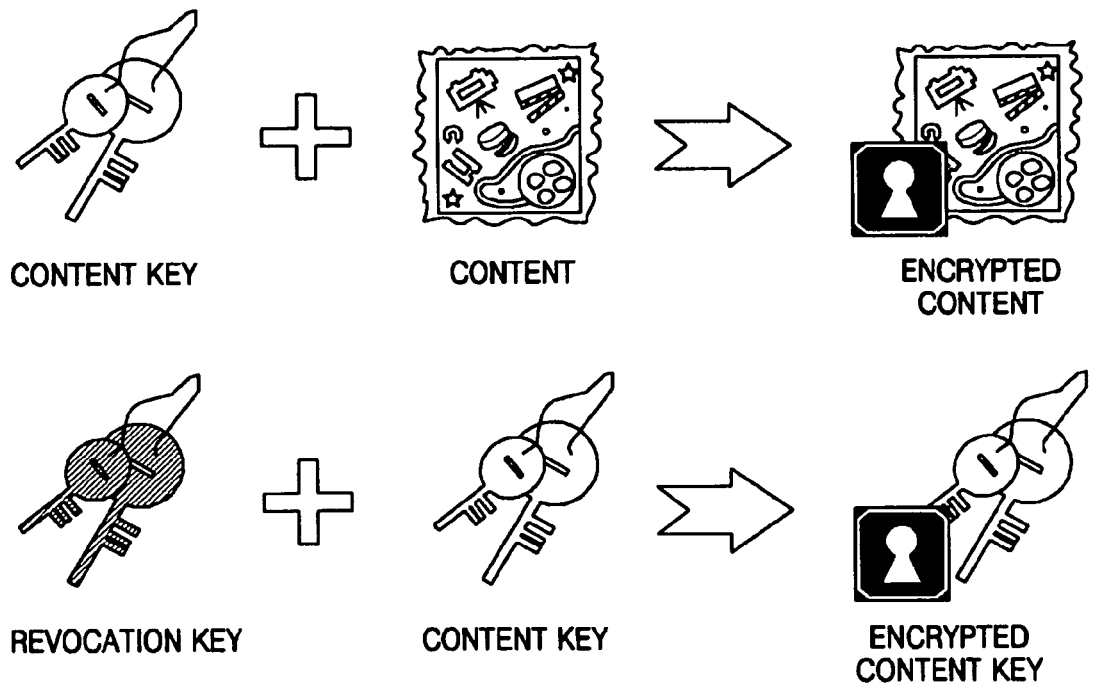
FIG. 1 illustrates the conventional broadcast encryption scheme.
Figure 2:
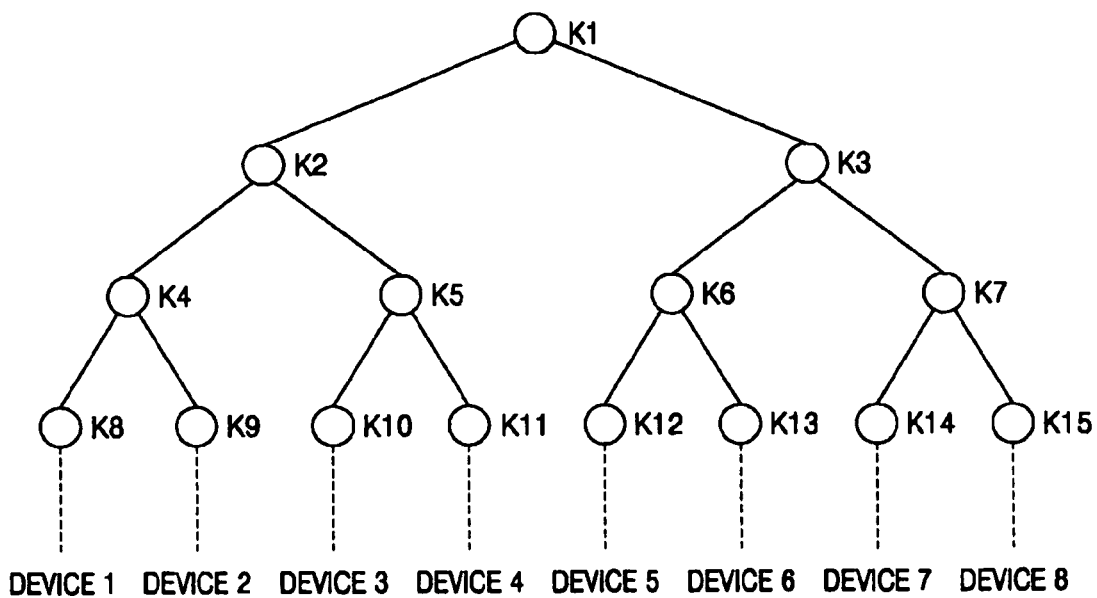
FIG. 2 illustrates an example of a tree used in the conventional broadcast encryption scheme.

DETAILED DESCRIPTION OF THE EXEMPLARY NON-LIMITING EMBODIMENTS OF THE PRESENT INVENTION

The present invention will now be described more fully by describing exemplary, non-limiting embodiments with reference to the accompanying drawings. In the drawings same reference characters denote analogous elements.

Figure 3:
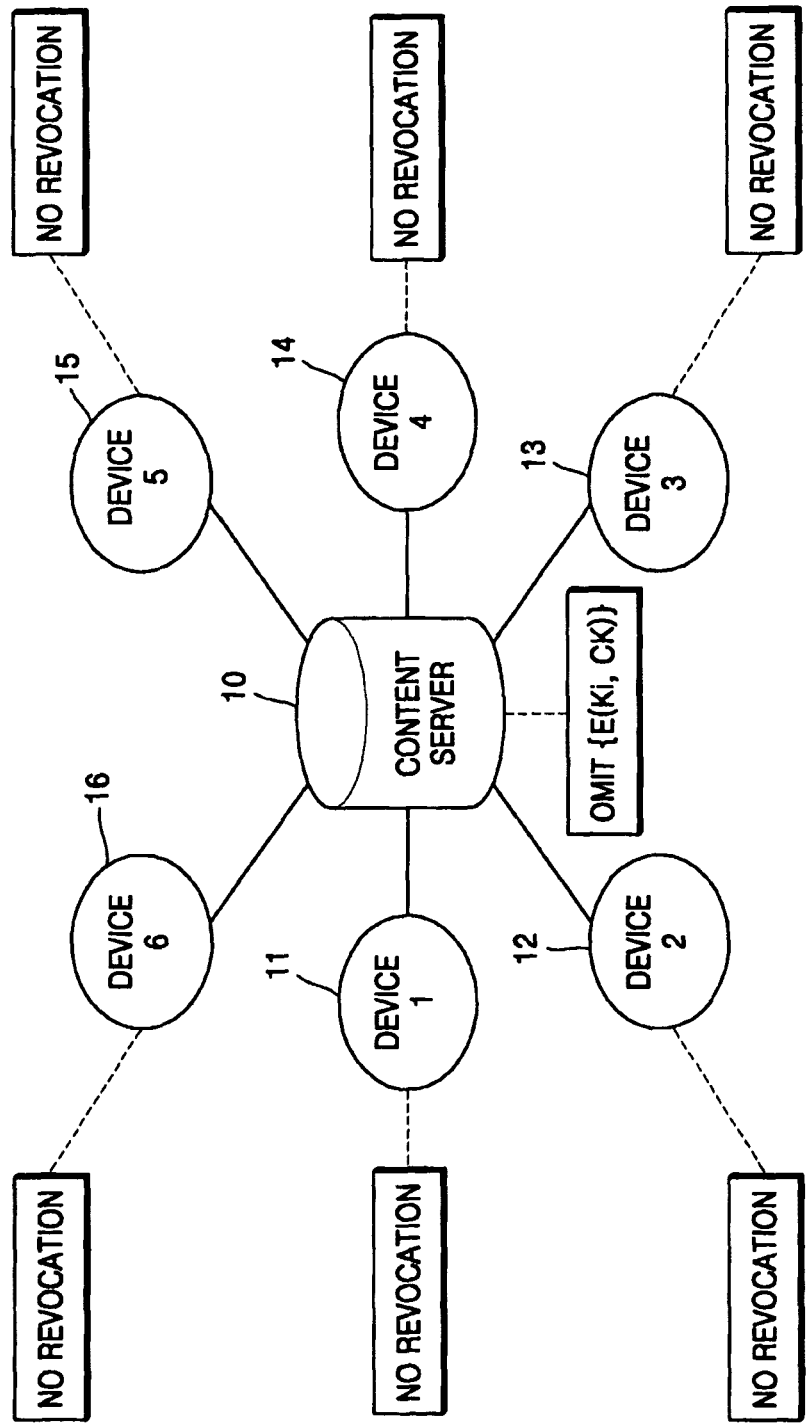
FIG. 3 illustrates a home network according to an exemplary, non-limiting embodiment of the present invention.

Referring to FIG. 3, a home network according to an exemplary embodiment of the present invention is formed with a content server 10 and six devices 11 through 16.

The content server 10 encrypts a content key by using a revocation key $\{Ki\}$ only when there is a revoked device among the devices 11 through 16, and if there is no revoked device among the devices 11 through 16, the process of encrypting a content key by using the revocation key $\{Ki\}$ is omitted.

Accordingly, only when there is a revoked device among the devices 11 through 16, the devices 11 through 16 decrypt the content key $\{E(Ki, CK)\}$ encrypted by using the revocation key $\{Ki\}$, and if there is no revoked device among the devices 11 through 16 (as depicted in FIG. 3), the devices 11 through 16 omit the process of decrypting the content key $\{E(Ki, CK)\}$ encrypted by using the revocation key $\{Ki\}$.

Thus, by encrypting a content key using the revocation key $\{Ki\}$ only when there is a revoked device and decrypting the encrypted content key, unnecessary encryption process and decryption process that occurred when no revoked device is present can be eliminated.

Figure 4:
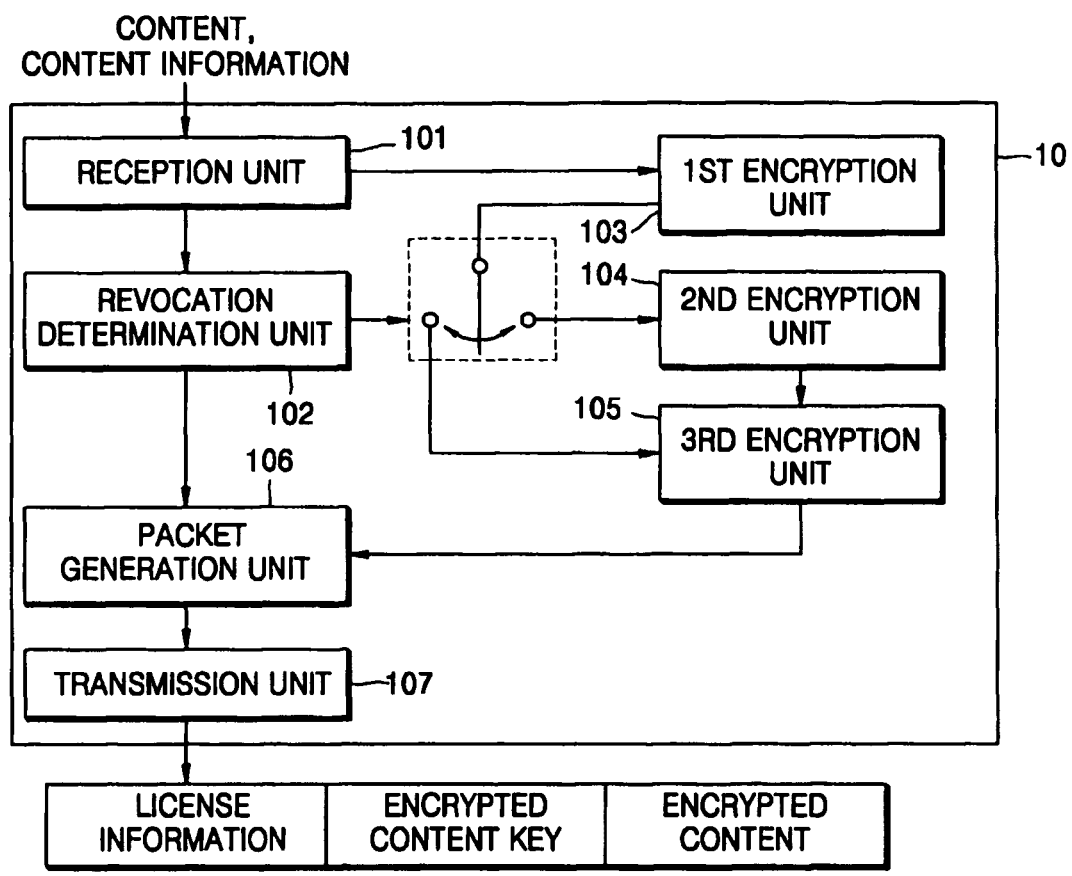
FIG. 4 is a diagram of the structure of a content encryption apparatus according to an exemplary, non-limiting embodiment of the present invention.

FIG. 4 is a diagram of the structure of a content encryption apparatus according to an exemplary embodiment of the present invention.

Referring to FIG. 4, the content encryption apparatus according to the exemplary embodiment of the present invention is mounted on the content server 10 shown in FIG. 3, and is formed with a reception unit 101, a revocation determination unit 102, a first encryption unit 103, a second encryption unit 104, a third encryption unit 105, a packet generation unit 106, and a transmission unit 107.

The reception unit 101 receives a content and license information with respect to the content. The reception unit 101 may receive this content and the license information related to the content provided by the content producer through a network such as the Internet, or may receive them through a recording medium such as a DVD.

By referring to the license information received in the reception unit 101, the revocation determination unit 102 determines whether or not there is a revoked device among the devices 11 through 16 having licenses on the content received in the reception unit 101, and according to the determination result, the revocation determination unit 102 connects the first encryption unit 103 to the second encryption unit 104 or to the third encryption unit 105.

More specifically, if the revocation key $\{Ki\}$ in the license information received in the reception unit 101 is the root key K1, the revocation determination unit 102 determines that there is no revoked device among the devices 11 through 16 having licenses for the content received in the reception unit 101, and if the revocation key $\{Ki\}$ in the license information received in the reception unit 101 is not the root key K1, the revocation determination unit 102 determines that there is a revoked device among the devices 11 through 16 having licenses for the content received in the reception unit 101.

The first encryption unit 103 encrypts the content received in the reception unit 101 with a content key corresponding to this content. As the result of the encryption in the first encryption unit 103, the encrypted content E(CK, Content) is generated. When the content server 10 is manufactured, the content key is stored in a place where the key can be protected safely from an intrusion from the outside.

According to the determination result of the revocation determination unit 102, the second encryption unit 104 selectively encrypts the content key used for the encryption in the first encryption unit 103 by using a revocation key {Ki} to prevent a revoked device from decrypting the content received in the reception unit 101. As the result of the encryption in the second encryption unit 104, an encrypted content key {E(Ki, CK)} is generated.

More specifically, if it is determined by the revocation determination unit 102 that there is a revoked device, that is, if the revocation key {Ki} in the license information received in the reception unit 101 is not the root key K1, the second encryption unit 104 is connected to the first encryption by the revocation determination unit 102 and as the result, the content key used for the encryption in the first encryption unit 102 is encrypted by using a revocation key {Ki}. Also, if it is determined by the revocation determination unit 102 that there is no revoked device, that is, if the revocation key {Ki} in the license information received in the reception unit 101 is the root key K1, the second encryption unit 104 is not connected to the first encryption by the revocation determination unit 102, and as the result, the content key is not encrypted by using the revocation key K1.

According to the determination result of the revocation determination unit 102, the third encryption unit 105 generates an encrypted content key E(Kd, CK) by encrypting the content key used for the encryption in the first encryption unit 103, or generates a double-encrypted content key E[Kd, {E(Ki, CK)}] by encrypting the content key encrypted by the second encryption unit 104.

More specifically, if it is determined by the revocation determination unit 102 that there is a revoked device, the third encryption unit 105 generates the double-encrypted content key E[Kd, {E(Ki, CK)}] by encrypting the content key encrypted by the second encryption unit 104. Also, if it is determined by the revocation determination unit 102 that there is no revoked device, the third encryption unit 105 is connected to the first encryption unit 103 by the revocation determination unit 102 and generates the encrypted content key E(Kd, CK) by encrypting the content key used for the encryption in the first encryption unit 103.

According to an encryption algorithm between the content server 10 and the devices 11 through 16, the third encryption unit 105 encrypts the content key used for the encryption in the first encryption unit 103, or encrypts the content key encrypted by the second encryption unit 104. For example, if the encryption algorithm between the content server 10 and the devices 11 through 16 is a secret key encryption scheme, the content server 10 and each of the devices 11 through 16 share one secret key and by using this secret key, the third encryption unit 105 encrypts the content key used for the encryption in the first encryption unit 103, or encrypts the content key encrypted in the second encryption unit 104.

Also, if the encryption algorithm between the content server 10 and the devices 11 through 16 is a public key encryption scheme, the content server 10 has respective public keys of the devices 11 through 16 and each of the devices 11 through 16 has a private key paired with one public key. By using these public keys, the third encryption unit 105 encrypts the content used for the encryption in the first encryption unit 103, or encrypts the content key encrypted in the second encryption unit 104.

These secret and public keys can be used with an identical value in a predetermined domain, such as for instance a home network shown in FIG. 3, or can be used with different values for devices 11 through 16 disposed in the home network shown in FIG. 3. In the former case, content can be freely distributed in a predetermined domain, such as a home network, and the secret key and the public key are also referred to as a domain key. Meanwhile, in the latter case, content can be distributed to only devices having secret keys among devices disposed in a home network and the secret key and the public key are also referred to as a device key.

The packet generation unit 106 generates a packet including license information received in the reception unit 101, the content encrypted by the first encryption unit 103, and the content key encrypted by the third encryption unit 105.

Figure 5:
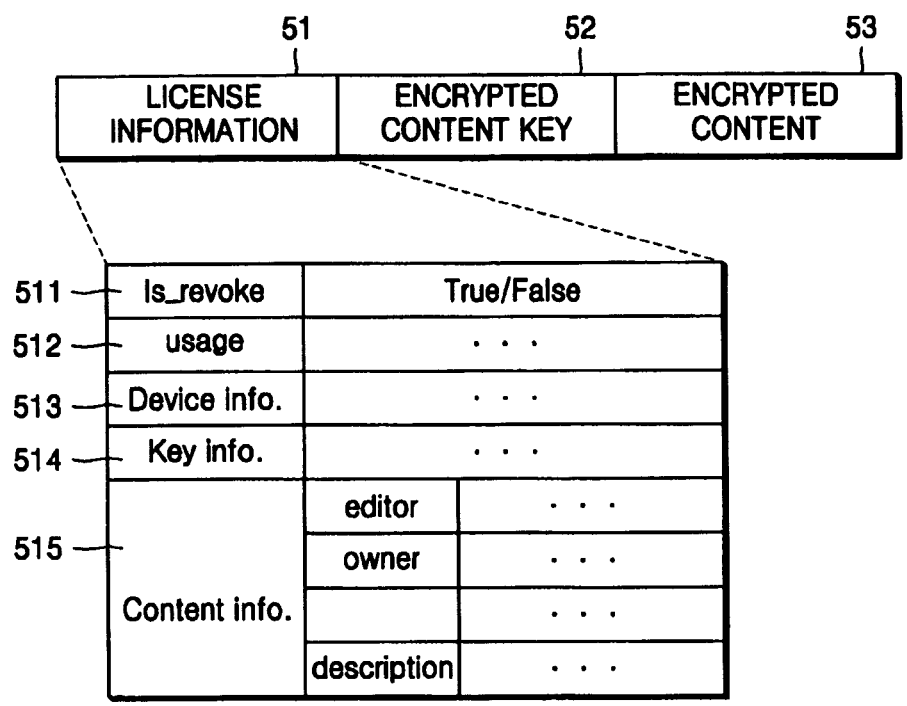
FIG. 5 is a diagram showing the format of a packet according to an exemplary, non-limiting embodiment of the present invention.

FIG. 5 is a diagram showing the format of a packet according to an exemplary embodiment of the present invention.

Referring to FIG. 5, the packet according to the exemplary embodiment of the present invention is formed with a license information field 51, an encrypted content key field 52, and an encrypted content field 53.

License information that is based on the license information received in the reception unit 101 is recorded in the license information field 51. The content key encrypted by the third encryption unit 105 is recorded in the encrypted content key field 52. The content key encrypted by the first encryption unit 103 is recorded in the encrypted content field 53.

Referring again to FIG. 5, the license information field 51 is formed with a revocation presence subfield 511, a usage information subfield 512, a device information subfield 513, a key information subfield 514, and a content information subfield 515. Those skilled in the art of the exemplary embodiment will understand that the license information field 51 should include the revocation presence subfield 511, and other fields can be included selectively.

A value indicating the determination result of the revocation determination unit 102, that is, a value indicating whether or not there is a revoked device, is recorded in the revocation presence subfield 511. More specifically, if it is determined by the revocation determination unit 102 that there is a revoked device, True (binary 1), a value indicating that there is a revoked device, is recorded in the revocation presence subfield 511. Also, if it is determined by the revocation determination unit 102 that there is no revoked device, False (binary 0), a value indicating that there is no revoked device, is recorded in the revocation presence subfield 511. That is, the revocation presence subfield 511 may be a flag indicating whether or not there is a revoked device.

Information on the use of a content, such as copy control information (CCI), is recorded in the usage information subfield 512. The CCI is information indicating whether or not the content can be copied, the frequency of permitted copy, and so on.

The identification (ID) of a device having a license for a content to be included in a packet to be generated in the packet generation unit 106 is recorded in the device information subfield 513.

Key information on an encryption algorithm between the content server 10 and the devices 11 through 16 is recorded in the key information subfield 514. For example, if the encryption algorithm between the content server 10 and the devices 11 through 16 is a public key encryption method, a public key is recorded in the key information subfield 514.

Information on a digital content to be included in the packet to be generated in the packet generation unit 106, for example, the content editor, the content owner, and the contents of the digital content, is recorded in the content information subfield 515.

The transmission unit 107 transmits the packet generated in the packet generation unit 106 to the devices 11 through 16 through the home network.

Figure 6:
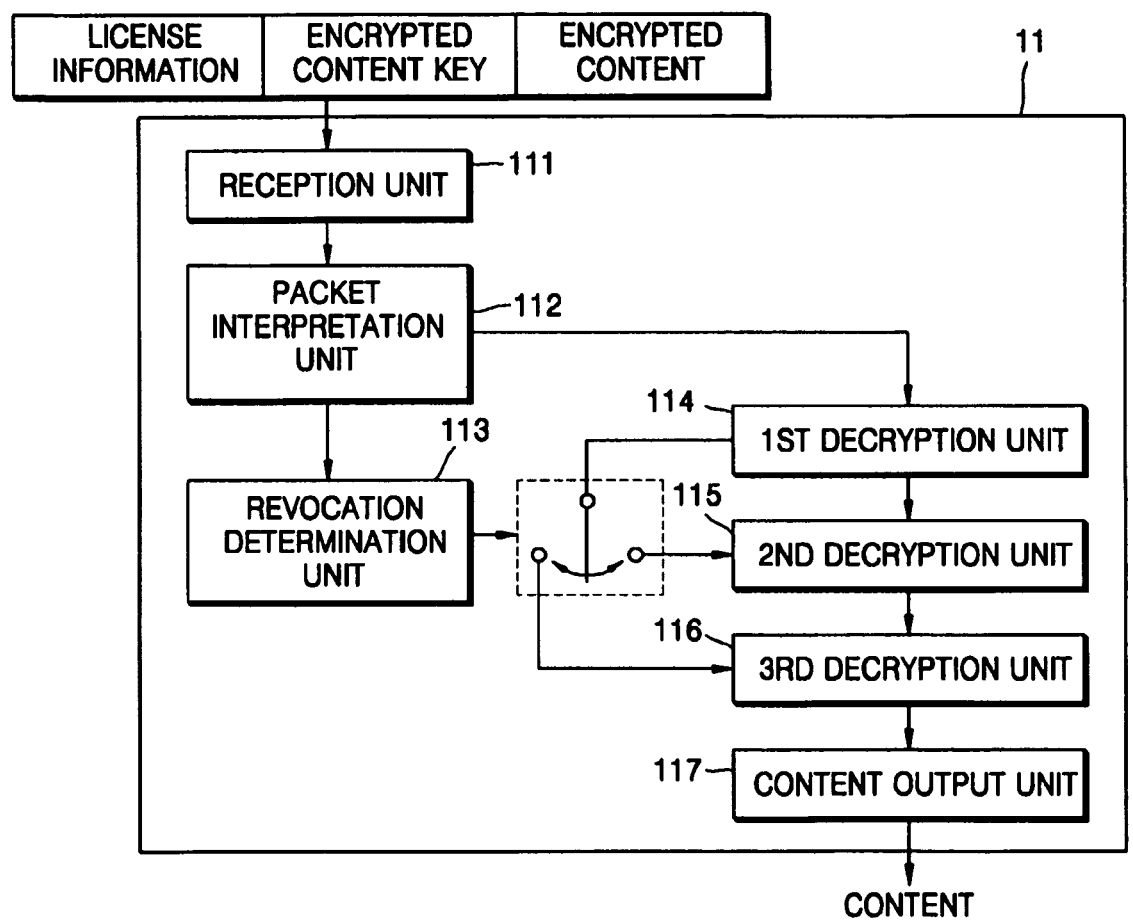
FIG. 6 is a diagram of the structure of a content decryption apparatus according to an exemplary, non-limiting embodiment of the present invention.

FIG. 6 is a diagram of the structure of a content decryption apparatus according to an exemplary embodiment of the present invention.

Referring to FIG. 6, the content decryption apparatus according to the exemplary embodiment is mounted on one of the devices 11 through 16, shown in FIG. 3. By way of an example, the content decryption apparatus may be mounted onto a device 11 depicted in FIG. 6 and is formed with a reception unit 111, a packet interpretation unit 112, a revocation determination unit 113, a first decryption unit 114, a second decryption unit 115, a third decryption unit 116, and a content output unit 117.

With reference to FIG. 6, a case where the content decryption apparatus according to the exemplary embodiment is mounted on the device 11 among the devices 11 through 16 shown in FIG. 3 will be explained. The following explanation analogously applies to the devices other than the device 11 when the content decryption apparatus according to the exemplary embodiment of the present invention is mounted.

The reception unit 111 receives a packet from the content server 10 through a home network.

The packet interpretation unit 112 interprets the packet received in the reception unit 111, and as the result, detects that the received packet is formed with a license information field 51, an encrypted content key field 52, and an encrypted content field 53, and detects, in particular, that the license information field 51 is formed with a revocation presence subfield 511, a usage information subfield 512, a device information subfield 513, a key information subfield 514, and a content information subfield 515.

By referring to the value of the revocation presence subfield 511 detected according to the interpretation result of the packet interpretation unit 112, the revocation determination unit 113 determines whether or not there is a revoked device among the devices 11 through 16 having licenses to obtain content included in an encrypted form in the packet received in the reception unit 111, and according to the determination result, the packet interpretation unit 112 connects the first decryption unit 114 to the second decryption unit 115 or to the third decryption unit 116.

More specifically, if the value of the revocation presence subfield 511 detected according to the interpretation result of the packet interpretation unit 112 indicates that there is a revoked device, that is, the value is True (binary 1), the revocation determination unit 113 determines that there is a revoked device among the devices 11 through 16 having licenses for content included in an encrypted form in the packet received in the reception unit 111. Also, if the value of the revocation presence subfield 511 detected according to the interpretation result of the packet interpretation unit 112 indicates that there is no revoked device, that is, the value is False (binary 0), the revocation determination unit 113 determines that there is no revoked device among the devices 11 through 16 having licenses for content included in an encrypted form in the packet received in the reception unit 111.

The first decryption unit 114 decrypts an encrypted content key E[Kd, {{E(Ki, CK)}}] or E(Kd, CK) recorded in the encrypted content key field 52 detected according to the interpretation result of the packet interpretation unit 112. As the result of the decryption in the first decryption unit 114, the encrypted content key {{E(Ki, CK)}} or the content key CK is generated.

If there is a revoked device, there will be a double-encrypted content key [Kd, {E(Ki, CK)}] recorded in the encrypted content key field 52, and if there is no revoked device, there will be an encrypted content key E(Kd, CK) recorded in the encrypted content key field 52. However, regardless of whether [Kd, {E(Ki, CK)}] or E(Kd, CK) is recorded in the encrypted content key field 52, the first decryption unit 114 only needs to decrypt data recorded in the encrypted content key field 52 mechanically by using a predetermined key Kd.

The first decryption unit 114 decrypts the encrypted content key E[Kd, {E(Ki, CK)}] or E(Kd, CK) according to the encryption algorithm between the content server 10 and the devices 11 through 16.

For example, if the encryption algorithm between the content server 10 and the devices 11 through 16 is a secret key encryption scheme, the content server 10 and each of the devices 11 through 16 share one secret key and by using this secret key the first decryption unit 114 decrypts the encrypted content key E[Kd, {E(Ki, CK)}] or E(Kd, CK) by using this secret key.

Also, if the encryption algorithm between the content server 10 and the devices 11 through 16 is a public key encryption scheme, the content server 10 has respective public keys of the devices 11 through 16 and each of the devices 11 through 16 has a private key paired with one public key. The first decryption unit 114 decrypts the encrypted content key E[Kd, {E(Ki, CK)}] or E(Kd, CK) by using this private key.

By using a revocation key {Ki} to prevent a revoked device from decrypting a content included in an encrypted form in the packet received in the reception unit 111, the second decryption unit 115 selectively decrypts the encrypted content key {E(Ki, CK)} according to the determination result of the revocation determination unit 113. As the result of the decryption in the second decryption unit 115, a content key CK is generated.

More specifically, if it is determined by the revocation determination unit 113 that there is a revoked device, that is, if the value of the revocation presence subfield 511 is True (binary 1), the second decryption unit 115 is connected to the first decryption unit 114 by the revocation determination unit 113, and as the result, the second decryption unit 115 decrypts the encrypted content key {E(Ki, CK)}, that is, the decryption result of the first decryption unit 114, by using a revocation key {Ki}.

Also, if it is determined by the revocation determination unit 113 that there is no revoked device, that is, if the value of the revocation presence subfield 511 is False (binary 0), the second decryption unit 115 is not connected to the first decryption unit 114 by the revocation determination unit 113, and as the result, the second decryption unit 115 does not decrypt the encrypted content key {E(Ki, CK)} by using a revocation key {Ki}. In this case, the content key CK is already generated by the decryption in the first decryption unit 114 and the encrypted content key {E(Ki, CK)} does not exist.

The third decryption unit 116 decrypts the encrypted content E(CK, Content) recorded in the encrypted content field 53 detected according to the interpretation result in the packet interpretation unit 112, by using the content key CK decrypted by the first decryption unit 114 or the content key CK decrypted by the second decryption unit 115 according to the determination result of the revocation determination unit 113. As the result of the decryption in the third decryption unit 116, the content that the content server 10 desires to provide to the device 11 is generated.

More specifically, if it is determined by the revocation determination unit 113 that there is a revoked device, the third decryption unit 116 decrypts the encrypted content E(CK, Content) recorded in the encrypted content field 53 detected according to the interpretation result in the packet interpretation unit 112, by using the content key CK decrypted by the second decryption unit 115. Also, if it is determined by the revocation determination unit 113 that there is no revoked device, the third decryption unit 116 is connected to the first decryption unit 114 by the revocation determination unit 113 and decrypts the encrypted content E(CK, Content) recorded in the encrypted content field 53 detected according to the interpretation result in the packet interpretation unit 112, by using the content key CK decrypted by the first decryption unit 114.

The content output unit 117 outputs the content decrypted by the third decryption unit 116 to a user. The content output unit 117 processes the content in a method corresponding to the characteristic of the content and outputs the content to the user. For example, if the content is in a compressed form, the content output unit 117 decompresses the content and outputs the result to the user. However, this is provided by way of a non-limiting example and those skilled in the art of the present invention will understand that the content output unit 117 can process a variety of jobs in order to output the content decrypted by the third decryption unit 116 to the user.

Figure 7:
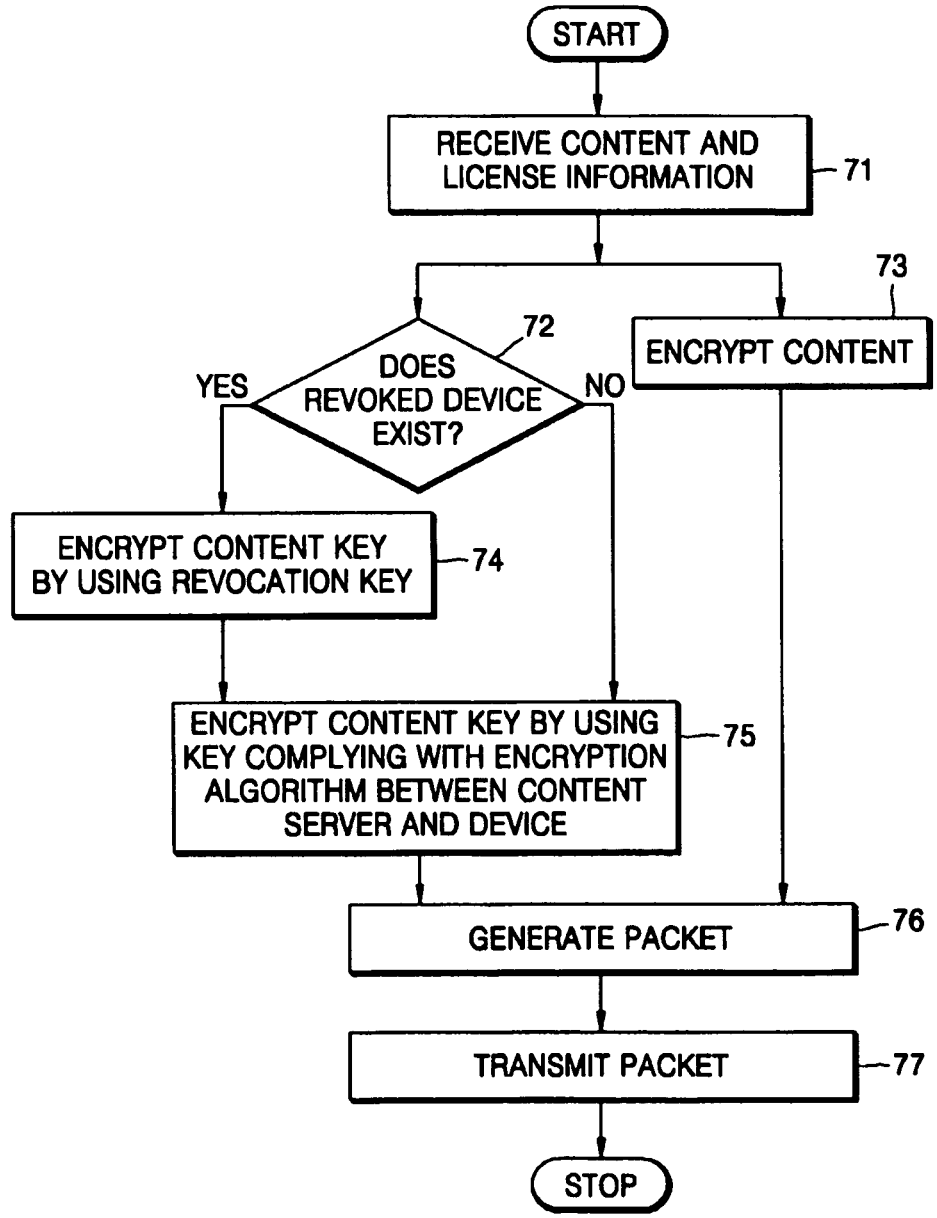
FIG. 7 is a flowchart of a content encryption method according to an exemplary, non-limiting embodiment of the present invention.

FIG. 7 is a flowchart of a content encryption method according to an exemplary embodiment of the present invention.

Referring to FIG. 7, the content encryption method according to the exemplary embodiment includes the following operations that may be processed successively in the content encryption apparatus of the content server 10 shown in FIG. 4. Accordingly, though omitted in the following explanation, the descriptions presented above in relation to the content encryption apparatus of the content server 10 shown in FIG. 4 may also apply to the content encryption method according to the exemplary embodiment.

In operation 71, the content server 10 receives content and license information on this content.

In operation 72, by referring to the license information received in the operation 71, the content server 10 determines whether or not there is a revoked device among the devices 11 through 16, that have a license for the content received in the operation 71.

In operation 73, the content server 10 encrypts the content received in the operation 71 with a content key corresponding to this content. As the result of the encryption in the operation 73, an encrypted content E(CK, Content) is generated.

In operation 74, if it is determined in the operation 72 that there is a revoked device, the content server 10 encrypts the content key used for the encryption in the operation 73, by using a revocation key {Ki} to prevent the revoked device from decrypting the content received in the operation 71. As the result of the encryption in the operation 74, an encrypted content key {E(Ki, CK)} is generated.

In operation 75, if it is determined in the operation 72 that there is no revoked device, the content server 10 generates a double-encrypted content key E[Kd, {E(Ki, CK)}], by encrypting the content key encrypted in the operation 74 with a key Kd according to an encryption algorithm between the content server 10 and the devices 11 through 16. Also, in operation 75, if it is determined in the operation 72 that there is no revoked device, the content server 10 generates an encrypted content key E(Kd, CK), by encrypting the content key used for the encryption in the operation 73 with a key Kd according to an encryption algorithm between the content server 10 and the devices 11 through 16.

In operation 76, the content server 10 generates a packet including the license information received in the operation 71, the content encrypted in the operation 73, and the content key encrypted in the operation 75.

In operation 77, the content server 10 transmits the packet generated in the operation 76 to the devices 11 through 16 through a home network.

Figure 8:
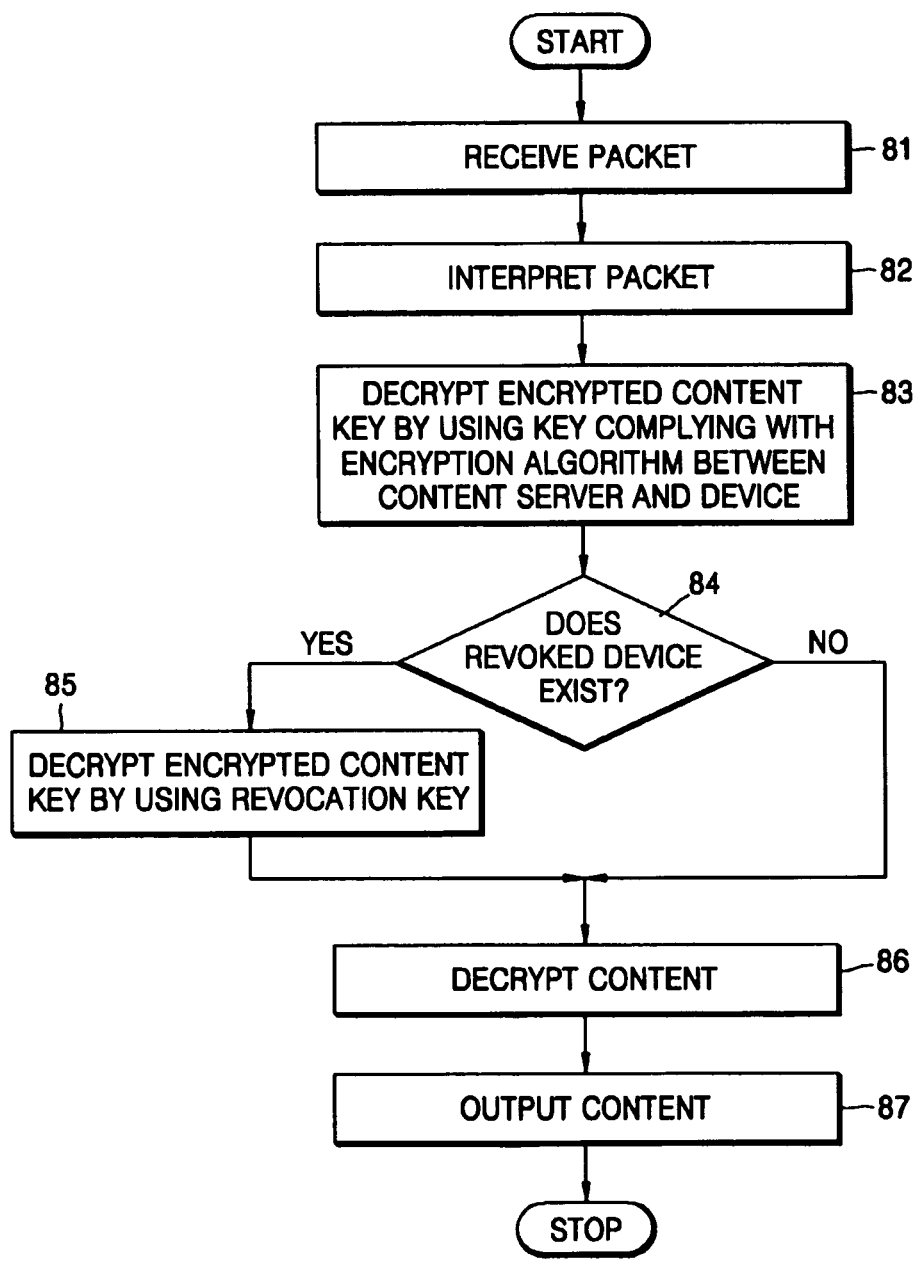
FIG. 8 is a flowchart of a content decryption method according to an exemplary, non-limiting embodiment of the present invention.

FIG. 8 is a flowchart of a content decryption method according to an exemplary embodiment of the present invention.

Referring to FIG. 8, the content decryption method according to the exemplary embodiment includes the following operations that are processed in a time series successively in the content decryption apparatus such as for instance the content encryption apparatus of the device 11 shown in FIG. 6. Accordingly, though omitted in the following explanation, the description presented above in relation to the content decryption apparatus of the device 11 shown in FIG. 6 may also apply to the content encryption method according to the exemplary embodiment of the present invention.

In operation 81, the device 11 receives a packet from the content server 10 shown in FIG. 3, for example, through a home network In operation 82, the device 11 interprets the packet received in the operation 81 and as the result, detects that the received packet is formed with a license information field 51, an encrypted content key field 52, and an encrypted content field 53, and detects in particular, that the license information field 51 is formed with a revocation presence subfield 511, a usage information subfield 512, a device information subfield 513, a key information subfield 514, and a content information subfield 515.

In operation 83, the device 11 decrypts the encrypted content key E[Kd, {E(Ki, CK)}] or E(Kd, CK) recorded in the encrypted content key field 52 detected according to the interpretation result of the operation 82, by using a key Kd according to an encryption algorithm between the content server 10 and the devices 11 through 16. As the result of the decryption in the operation 83, an encrypted content key E[Kd, {E(Ki, CK)}] or E(Kd, CK) is generated. As described above, E[Kd, {E(Ki, CK)}] is a double-encrypted content key encrypted by using a key Kd according to the encryption algorithm between the content server 10 and the devices 11 through 16, and a revocation key {Ki} to prevent decryption of the content included in an encrypted form in the packet received in the reception unit 11. Meanwhile, E(Kd, CK) is a content key encrypted by using only the key Kd according to the encryption algorithm between the content server 10 and the devices 11 through 16.

In operation 84, by referring to the value of the revocation presence subfield detected according to the interpretation result of the operation 82, the device 11 determines whether or not there is a revoked device among the devices 11 through 16 that have the licenses for the content included in an encrypted form in the packet received in the operation 81.

In operation 85, if it is determined in the operation 84 that there is a revoked device, the device 11 decrypts the encrypted content key {E(Ki, CK)} that is the result of the decryption in the operation 83, by using a revocation key {Kl} to prevent decryption of the content included in an encrypted form in the packet received in the operation 81. As the result of the decryption in the operation 85, a content key CK is generated.

In operation 86, if it is determined in the operation 84 that there is a revoked device, the device 11 decrypts the encrypted content E(CK, Content) recorded in the encrypted content field 53 detected according to the interpretation result of the operation 82, by using the content key CK decrypted in the operation 85.

Also, in operation 86, if it is determined in the operation 84 that there is no revoked device, the device 11 decrypts the encrypted content E(CK, Content) recorded in the encrypted content field 53 detected according to the interpretation result of the packet interpretation unit 112, by using the content key CK decrypted in the operation 83. As the result of the decryption in the operation 86, the content that the content server 10 desires to provide to the device 11 is generated.

In operation 87, the device 11 outputs the content decrypted in the operation 86 to the user.

According to the exemplary embodiments of the present invention, only when there is a revoked device among devices to which the broadcast encryption scheme is applied, a content key is encrypted by using a revocation key, and the encrypted content key is decrypted. By doing so, an unnecessary encryption process and decryption process that occurs when there is no revoked device are not performed any more. As a result, contents can be more efficiently protected.

The exemplary embodiments of the present invention can be written as computer programs and can be implemented in general-use digital computers that execute the programs using a computer readable recording medium. Also, the data structure used in the exemplary embodiments of the present invention described above can be recorded on a computer readable recording medium through a variety of ways.

Examples of the computer readable recording medium include magnetic storage media (e.g., ROM, floppy disks, hard disks, etc.), and optical recording media (e.g., CD-ROMs, or DVDs).

While the present invention has been particularly shown and described with reference to the exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the exemplary embodiments but by the appended claims, and all differences within the scope will be construed as being included in the present invention.

What is claimed is:

1. A decryption method comprising:
   decrypting by a computer a single-encrypted content key by using only a first key based on not having any devices with licenses for a predetermined content being revoked;
   decrypting by the computer a double-encrypted content key by using the first key and re-decrypting the decrypted content key by using a second key that prevents at least one revoked device from decrypting the predetermined content based on having at least one device among the devices with licenses for the predetermined content, being revoked;
   determining if the at least one device is revoked by referring to information included in a packet received from a server providing the predetermined content; and
   decrypting with the decrypted content key the predetermined content,
   wherein the decrypted content key is one of the single-decrypted content key and the double-decrypted content key, based on having said at least one revoked device among the devices with the licenses for the predetermined content, and wherein the content key is used to encrypt the predetermined content.

2. The method of claim 1, wherein the double-encrypted content key is double encrypted by using the first key and the second key if the at least one device among the devices having the licenses for the predetermined content is revoked.

3. The decryption method of claim 1, further comprising displaying by a display the decrypted predetermined content.

4. The decryption method of claim 1, further comprising outputting the decrypted predetermined content to a display for viewing by a user.

5. A decryption apparatus, comprising:
   a first decryption unit decrypting a single-encrypted content key by using only a first key corresponding to a predetermined key based on not having any devices with licenses for the predetermined content being revoked; and
   a second decryption unit decrypting a double-encrypted content key by using the first key and re-decrypting the decrypted content key by using a second key that prevents at least one revoked device from decrypting the predetermined content based on having at least one device among the device with licenses for the predetermined content, being revoked,
   wherein the content key is a key encrypting the predetermined content,
   wherein the decryption apparatus is executed on the computer,
   wherein the second decryption unit determines if the at least one device is revoked by referring to information included in a packet received from a server providing the predetermined content and decrypts with the decrypted content key the predetermined content, and
   wherein the decrypted content key is one of the single-decrypted content key and the double-decrypted content key, based on having said at least one revoked device among the devices with the licenses for the predetermined content.

6. A non-transitory computer readable recording medium having embodied thereon a computer program for executing a decryption method, wherein the decryption method comprises:
   decrypting a single-encrypted content key by using only a predetermined key based on not having any devices with licenses for a predetermined content being revoked; and
   decrypting a double-encrypted content key by using the first key and re-decrypting the decrypted content key by using a revocation key that prevents at least one revoked device from decrypting the predetermined content based on having at least one device among the devices with licenses for the predetermined content, being revoked
   determining if the at least one device is revoked by referring to information included in a packet received from a server providing the predetermined content; and
   decrypting with the decrypted content key the predetermined content,
   wherein the content key is used to encrypt the predetermined content, and
   wherein the decrypted content key is one of the single-decrypted content key and the double-decrypted content key, based on having said at least one revoked device among the devices with the licenses for the predetermined content.

7. An encryption method comprising:
   single-encrypting, by a computer, a content key by using only a first key based on not having any devices with licenses for a predetermined content being revoked; and
   encrypting, by a computer, a content key by using a second key that prevents at least one revoked device from decrypting the predetermined content based on having at least one device among the devices with licenses for the predetermined content, being revoked and double-encrypting the encrypted content key by using the first key,
   wherein the content key is used to encrypt the predetermined content, wherein the encryption method further comprises determining if the at least one device is revoked by referring to information included in a packet received from a server providing the predetermined content; and encrypting with the encrypted content key the predetermined content, and wherein the encrypted content key is one of the single-encrypted content key and the double-encrypted content key, based on having said at least one revoked device among the devices with the licenses for the predetermined content.

8. An encryption apparatus comprising:

a first encryption unit single-encrypting a content key by using only a first key based on not having any devices with licenses for a predetermined content are being revoked; and a second encryption unit encrypting the content key by using a second key that prevents at least one revoked device from decrypting the predetermined content based on having at least one device among the devices with licenses for the predetermined content being revoked, and double-encrypting the encrypted content key by using the first key, wherein the content key is used to encrypt the predetermined content, and wherein the encryption apparatus is executed on a computer, wherein the encryption method further comprises determining if the at least one device is revoked by referring to information included in a packet received from a server providing the predetermined content; and encrypting with the encrypted content key the predetermined content, and wherein the encrypted content key is one of the single-encrypted content key and the double-encrypted content key, based on having said at least one revoked device among the devices with the licenses for the predetermined content.

9. A non-transitory computer readable recording medium having embodied thereon a computer program for executing an encryption method, wherein the encryption method comprises:

single-encrypting a content key by using only a predetermined key based on not having any devices with licenses for a predetermined content being revoked; and encrypting a content key by using a revocation key that prevents at least one revoked device from decrypting the predetermined content based on having at least one device among the devices with licenses for the predetermined content, being revoked and double-encrypting the encrypted content key by using the predetermined key, wherein the content key is used to encrypt the predetermined content, wherein the encryption method further comprises determining if the at least one device is revoked by referring to information included in a packet received from a server providing the predetermined content; and encrypting with the encrypted content key the predetermined content, and wherein the encrypted content key is one of the single-encrypted content key and the double-encrypted content key, based on having said at least one revoked device among the devices with the licenses for the predetermined content.

10. A non-transitory computer readable recording medium having executable instructions recorded thereon, comprising:

encrypting predetermined content based on information in a data structure, which comprises:
a first field where the encrypted content is recorded; and
a second field where license information relating to the predetermined content is recorded, wherein the second field comprises a first subfield recording a value indicating whether a device having a license for the predetermined content is revoked, wherein the executable instructions further comprise performing one of a single encryption of a content key for the predetermined content and a double encryption of the content key based on information in the first subfield, wherein the content key is used to encrypt the content, wherein the encrypting further comprises determining if the at least one device is revoked by referring to information included in a packet received from a server providing the predetermined content; and encrypting with the encrypted content key the predetermined content, and wherein the encrypted content key is one of the single-encrypted content key and the double-encrypted content key, based on having said at least one revoked device among the devices with the licenses for the predetermined content.

11. The recording medium of claim 10, wherein the data structure further comprises:

a third field where an encrypted content key corresponding to the encrypted content is recorded.

* * * * *